United States Patent [19]
Estes

[11] Patent Number: 4,564,738
[45] Date of Patent: Jan. 14, 1986

[54] METHOD FOR ALIGNMENT OF AN ELECTRON BEAM TO THE ADJACENT FACES OF SEGMENTS OF ROCK DRILL BITS

[75] Inventor: Jeffrey M. Estes, Downers Grove, Ill.

[73] Assignee: Sciaky Bros., Inc., Chicago, Ill.

[21] Appl. No.: 551,483

[22] Filed: Nov. 14, 1983

[51] Int. Cl.[4] .............................................. B23K 15/00
[52] U.S. Cl. ........................ 219/121 ED; 76/108 A; 219/121 EU; 219/121 EM
[58] Field of Search ................. 219/121 EB, 121 ED, 219/121 EM, 121 EU, 121 EV, 121 EW; 175/375; 76/108 A, 108 R; 228/102, 103

[56] References Cited

U.S. PATENT DOCUMENTS

| | | | |
|---|---|---|---|
| 3,789,185 | 1/1974 | Baldwin et al. | 219/121 EU |
| 4,098,448 | 7/1978 | Sciaky et al. | 219/121 EM |
| 4,209,684 | 6/1980 | Evans | 219/121 EM |

FOREIGN PATENT DOCUMENTS

| | | | |
|---|---|---|---|
| 139104 | 12/1979 | German Democratic Rep. | 219/121 EW |
| 143145 | 8/1980 | German Democratic Rep. | 219/121 EW |
| 143146 | 8/1980 | German Democratic Rep. | 219/121 EW |
| 55-16791 | 2/1980 | Japan | 219/121 EW |
| 58-154472 | 9/1983 | Japan | 219/121 EB |

OTHER PUBLICATIONS

Davis et al., "Hardware Technique for Processing EB Backscatter Signal for Registration", IBM Technical Journal, vol. 22, No. 3 1010-11, Aug. 1979.

*Primary Examiner*—C. L. Albritton
*Assistant Examiner*—Alfred S. Keve
*Attorney, Agent, or Firm*—J. L. Solomon

[57] ABSTRACT

This invention relates to a method and apparatus for the alignment of a corpuscular beam, such as an electron or laser beam, to the abutting surfaces of stepped cylindrical segments whose abutting surfaces may be several inches in thickness, so that the beam will be directed along a path which includes all portions of the abutting surfaces to be joined by welding. The parts to be welded are segments of a stepped cylinder having sections of different radius. The parts to be welded are fixed to a table which can rotate the parts about a fixed axis about which the parts are positioned to form the cylinder. The coordinates at several points along the outer periphery of the joint to be welded are determined with respect to two mutually perpendicular axes, one of which is parallel to the axis about which the rotary table and cylinder rotate. By extrapolation of lines passing through these points, a determination is made by computer of the angular deviation of the plane of the joint from the axis of the rotatable table and its displacement from the axis. The electron beam gun is then caused to move along the two axes in such a way that the beam passes through the abutting surfaces of the segments to be welded.

6 Claims, 9 Drawing Figures

METHOD FOR ALIGNMENT OF AN ELECTRON BEAM TO THE ADJACENT FACES OF SEGMENTS OF ROCK DRILL BITS

This invention relates to a method and apparatus which is useful in joining workpieces by welding large, plane surfaces of those workpieces which are in abutment by bombarding those surfaces with a concentrated beam of high energy particles such as a beam of electrons or a laser beam. One example of such a workpiece is the drill bit of the type normally used for deep drilling of oil wells. These drill bits are normally constructed from an assembly of three segments which are welded along their abutting faces after clamping and alignment in a suitable fixture which is part of a welding machine. In a welding machine utilizing an electron beam, the three segments are clamped upon a rotary turntable having horizontal rotation about a vertical axis, and the electron beam gun is mounted upon a slide mechanism which allows the gun to be moved along two axes, one horizontal and the second vertical. Both the horizontal and the vertical motions can of course be effected at the same time in order to produce a diagonal motion. A machine of this type is illustrated in U.S. Pat. No. 4,098,448.

BACKGROUND OF INVENTION

Electron beam welding requires high accuracy in positioning the beam over the joint due to the small diameter of the electron beam, from 0.010" to perhaps 0.050" depending upon the power supplied by the beam. The greater the power, the larger the diameter of the beam in a typical machine. Deep penetration of the electron beam also requires precise alignment of the welding beam and the joint.

In order to satisfactorily weld the three segments which comprise the drill bit, it is necessary that the electron beam, as it moves in relation to the drill bit, always take a path which passes through the abutting faces of the joint being welded. Heretofore in the welding of drill bits, because of variations in dimension of one segment from another due to manufacturing tolerances, and because of differences in the clamping effect of the means for clamping the segments together, it has been found that imperfect and partially welded joints have resulted due to the fact that the path of the electron beam did not pass through the full surface represented by the plane of the abutting faces of the parts being welded. It was found that whereas the beam passed through a plane which passed through the vertical axis of the turntable upon which the parts were mounted, the parts themselves, due to manufacturing imperfections and clamping differences, did not present their abutting faces in a plane which passed through the vertical axis. The plane of the abutting faces could be tilted to one side or the other of the vertical axis of the turntable. The result was that only a partial welding of the surfaces was effected, leading to the necessity to reweld or completely reject the partially welded drill bits. The old methods for aligning the beam to the plane of the abutting joint were time-consuming and crude and resulted in many welds which did not pass inspection.

FIELD OF INVENTION

It is the object of the present invention to provide a method for the alignment of an electron or other high energy beam to the plane of a desired weld seam represented by the abutting faces of the workpieces, which is positive in result, accomplished in a fraction of the time normally utilized by the older methods and is entirely automatic in operation, requiring no judgment on the part of the operator which could lead to error.

RELATED ART

In the past, attempts have been made to solve the problem of alignment of the weld seam face to the plane of the electron beam by purely mechanical means. An example of this is illustrated in U.S. Pat. No. 4,045,040. According to the specification of this patent, the machine to practice the invention must be fitted with a chuck to support and clamp the three 120° segments which comprise the rock bit. The chuck holding the segments is mounted upon an elaborate mechanical device including a gimbal and swing arrangement for making a manual alignment of the seam with the beam by trial and error. It is essential in this setup that the plane passing through the abutting faces of the segments to be welded pass through the vertical axis of the clamping device (the rotating chuck), and that at the same time, the planes through all three welding surfaces meet at the axis of rotation of the rotary chuck. This is necessary because the electron gun is mounted upon a slide mechanism which allows the gun to move only in the vertical direction. The three welds which hold the three segments together are made successively by turning the rotating chuck 120° from one seam to the next after each weld is completed until the three seams are welded. Great care and skill are required in setting up and adjusting the position of the segments in relation to the electron gun, making for a time-consuming and costly operation, in addition to the high cost of the complicated mechanical equipment required. In contrast, the method of the new invention does not require the costly mechanical fixturing and adjusting apparatus described in the old art. It does not require a cut and try approach, and leads only to the welding of rock bits in the shortest possible time.

BRIEF DESCRIPTION OF DRAWINGS

The method of operation and the advantages and utility of the present invention will become more fully apparent from the following descriptions considered in connection with the accompanying drawings in which.

DESCRIPTION OF THE PREFERRED EMBODIMENT

Figure 1:
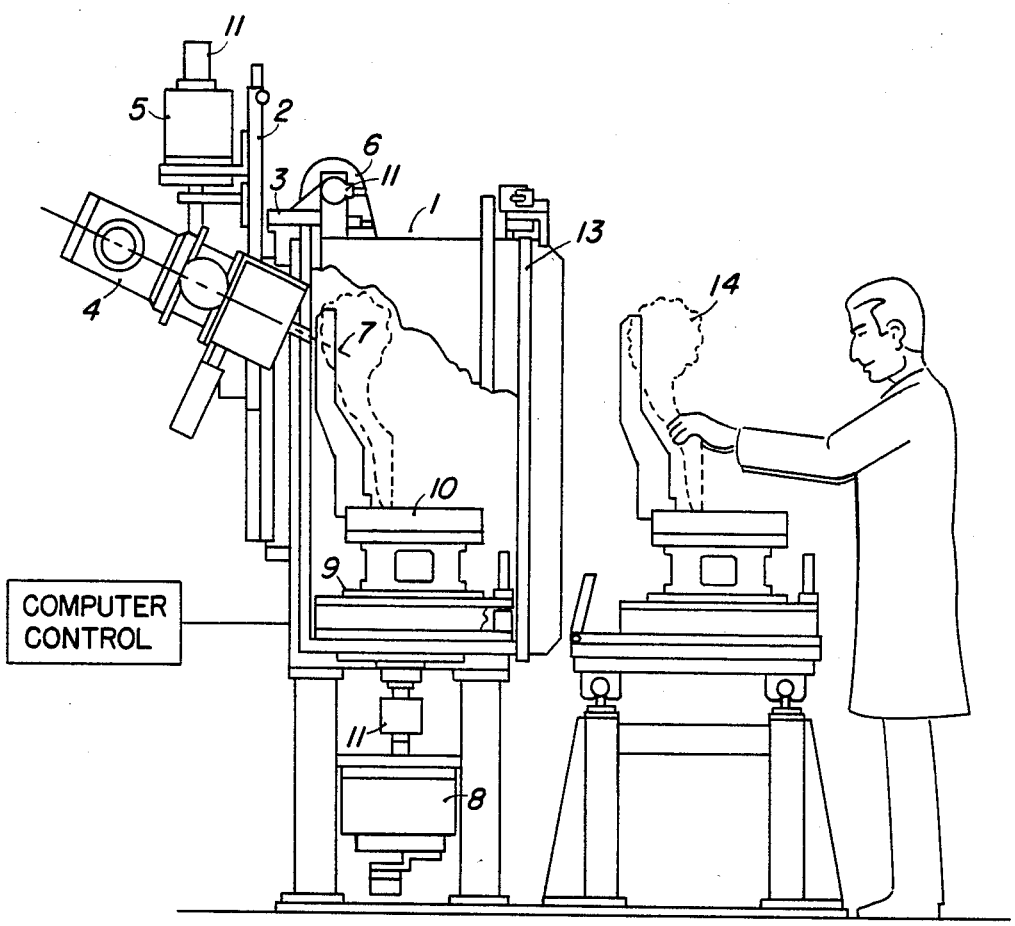
FIG. 1 is a side view of an electron beam welding machine used in the welding of rock bits for deep well drilling.

FIG. 1 illustrates an electron beam welding machine which is suited to the welding of rock bits. The vacuum chamber (1) is fitted with a vertical slide mechanism (2) and a horizontal slide mechanism (3) upon which the electron beam gun (4) is mounted. A vertical drive and screw arrangement (5) is provided, as well as a horizontal drive and screw arrangement (6). The electron beam (7) generated by the electron gun is passed into the welding chamber through a slot about 2" wide and 20" long, which is properly sealed about its periphery so as to allow the maintenance of the proper high vacuum condition in the electron gun and in the welding vacuum chamber. A rotary table drive assembly (8) is mounted underneath the vacuum chamber and functions through proper rotary seals to drive the rotary table (9) and the fixture (10) mounted upon it within the vacuum chamber. Transducers (11) functioning in conjunction with the drive produce signals which define the angular position of the turntable within the chamber with respect to a given reference axis. Transducers on the horizontal and vertical cross slides also define the position of the beam with reference to given axes. A sliding door (13) is provided for opening and closing the chamber and providing entrance to the interior for loading of parts. The 120° conical segments (14), three of which comprise a drill bit, are mounted on a fixture (10) designed for the particular size of drill bits to be welded. The segments are clamped by suitable means to the fixture, and the fixture tooling is then rolled into the vacuum chamber and fastened to the rotary table. The door (13) then slides closed, the machine is pumped down to the low pressure required for electron beam welding, and the machine put in automatic operation so it is caused to follow a given routine which determines the orientation of the three abutting pairs of surfaces to be welded, and defines and controls the motion of the gun so that the electron beam generated by the gun will fall upon the plane between the faces to be welded along the complete and full path required to be taken by the beam in order to completely weld the abutting faces of the segments being joined.

Figure 2:
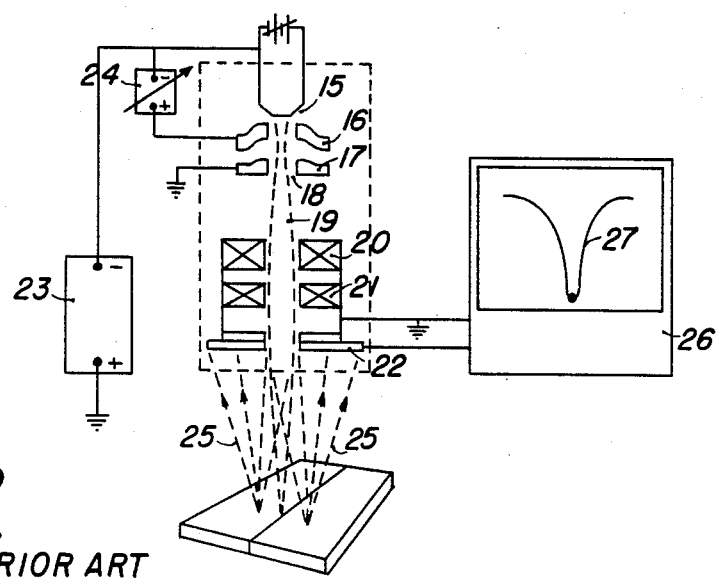
FIG. 2 is a schematic illustration of the essential parts of an electron beam gun and an electron beam seam finder device.

The apparatus which is utilized to generate the electron beam and which is also used to determine the point of impingement of the electron beam with reference to the outer edge of the joint to be welded is illustrated in FIG. 2. The electron gun is shown schematically and comprises an electron emitter (15), a cathode electrode (16), an anode electrode (17) having an orifice (18) through which the beam (19) can pass, an electromagnetic focusing coil (20), and electromagnetic deflection coils (21). A secondary electron pickup electrode (22) is mounted on insulators to the lower face of the electron gun. Electrons emitted from the electron emitter are electrostatically focused by the cathode and anode electrodes and passed through the hole in the focusing coil, where they are focused to the surface of the workpieces. Deflection coils (21) are utilized to deflect the beam either longitudinally to or transverse to the seam between the workpieces. By passing suitable currents through the deflection coils, the beam may be swept across the seam by a motion that varies either sinusoidally or linearly by the use of a triangular sweep or by means of a circular sweep through the use of currents through the two sets of deflection coils acting at right angles to each other, which vary according to the sine and cosine functions. A high voltage power supply (23) furnishes the accelerating potential to accelerate the electrons emitted by the electron emitter, which are directed toward the work through the holes in the center of the various elements of the gun as described above, and a bias supply (24) controls the intensity of the current delivered to the work. By varying the negative potential of the cathode electrode with respect to the emitter, the current which reaches the work may be adjusted to any desired level during the welding or the seam finding operations. The electron beam (19), after striking the work, passes through the work and returns to the positive terminal of the high voltage power supply. The negative terminal of the high voltage power supply is connected to the emitting electrode. When the high energy electrons in the beam strike the surface of the workpiece, secondary electrons (25) will be emitted from the work surface and will be picked up by the secondary electron pickup electrode (22). The production of secondary electrons will be at a maximum when the beam strikes the surface of the workpiece, and will be at a minimum when the beam is focused and well centered along the edges of the seam adjoining the two workpieces. The secondary electron current picked up by the electrode is amplified by suitable apparatus and its amplitude is displayed on the screen of a cathode ray oscilloscope (26) in the form as illustrated at (27). The heavier dot indicates the position of the seam, and the presence of the dot at the lowest part of the trace indicates that the beam is centered over the seam. The seam finding principle is described in U.S. Pat. No. 3,609,288 issued to Albert M. Sciaky on Sept. 28, 1971. By the use of the method described, one can achieve a highly accurate alignment of the electron beam to the joint to be welded.

Figure 3:
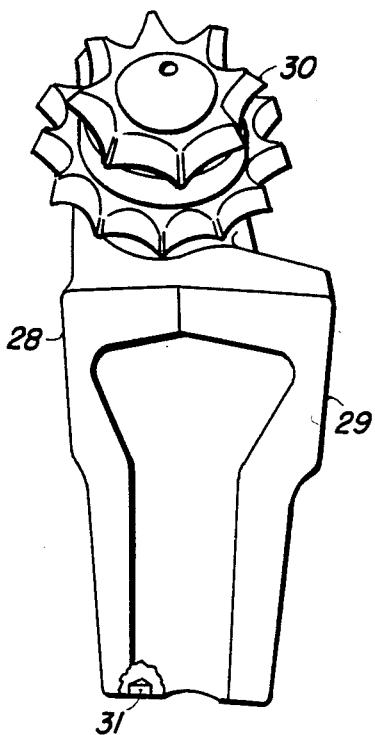
FIG. 3 is a view of one of the three segments which comprise a complete rock drill bit when the three segments are welded together as seen from the inner faces which form the weld joint.

FIG. 3 is a drawing of a typical segment utilized in manufacturing a rock bit. The view is taken from the side facing the two faces of the segment, (28) and (29) respectively, which are each to be welded to one of the faces of the two remaining segments which make up the drill bit. The cutters (30) are shown in place as they are during the welding procedure.

Figure 4A:
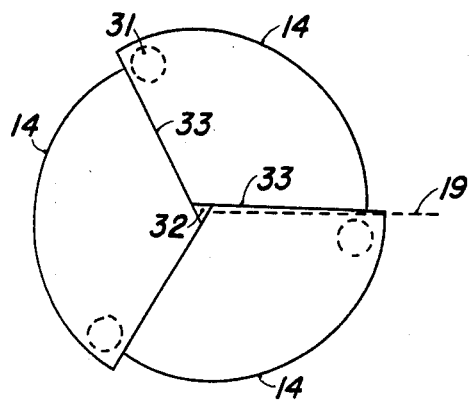
FIG. 4A is a bottom view of the three segments of a rock bit in their relative positions on a fixture showing the electron beam aligned to the center of rotation of the fixture.
Figure 4B:
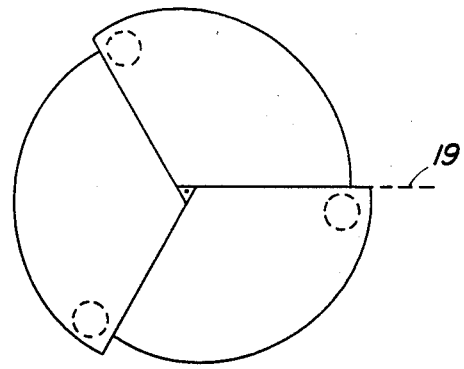
FIG. 4B illustrates the three segments with the beam aligned to the plane of the abutting edges of the segments.

FIGS. 4A and 4B are bottom views of the three segments as they are in position in the clamping fixture of the welding machine. The rotary table upon which the segments are mounted is provided with pins over which the recess (31) at the lower part of the segment is placed in order to provide registration of the three segments, one with respect to the other. Theoretically the segments are to be so made so that they meet at the center of rotation (32) of the rotary fixture. However, due to tolerances in manufacturing, wear of the registration pins on the rotary table, and differences in clamping, it is found that the three segments are often held as illustrated in FIG. 4A with the plane between the two faces to be welded offset slightly from the center of rotation (32). If the electron beam (19) is so positioned that it passes through the center of rotation of the rotary table, one can readily see that the faces of the segments will not be completely welded towards the center of the drill bit. The various elements of the machine, which include position servo mechanisms, transducers and encoding devices, and computer controls, function in cooperation with one another in a series of steps which lead to correcting the position of the beam with respect to the plane of the joint to be welded so that the beam is aligned with the joint as shown in FIG. 4B, though the joint may not pass through the center of rotation of the worktable.

Figure 5:
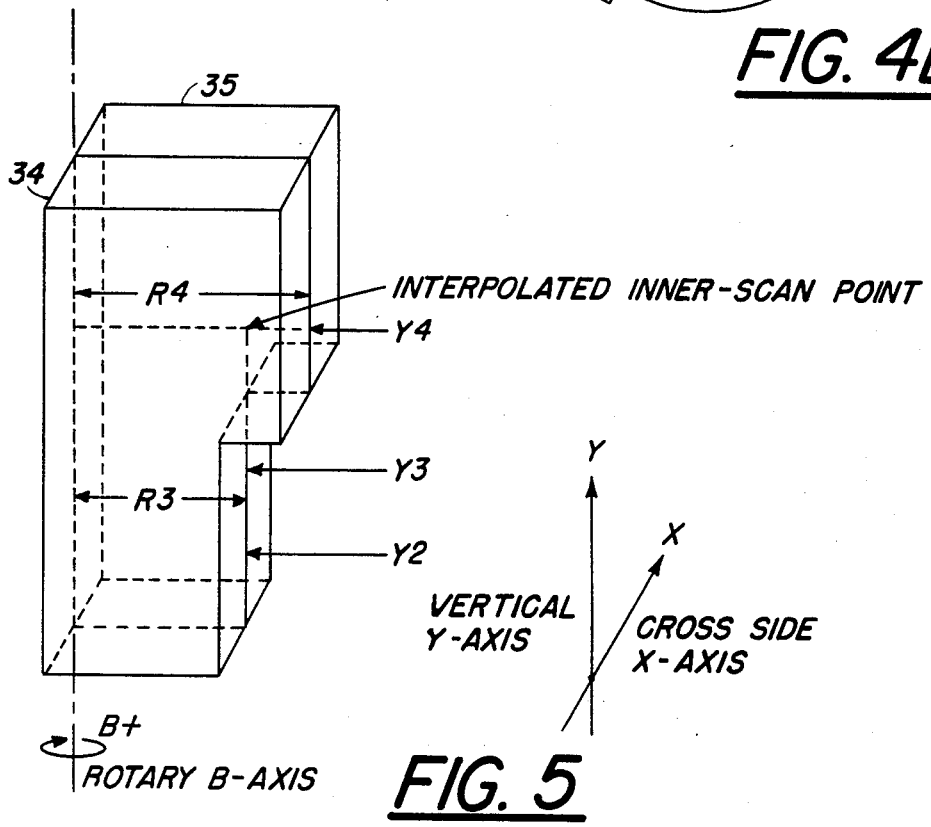
FIG. 5 illustrates schematically a portion of the weld joint between two segments.
Figure 6:
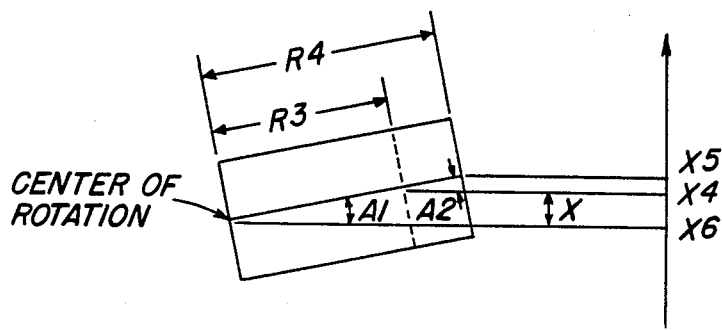
FIGS. 6 and 7 are top views of FIG. 5.
Figure 7:
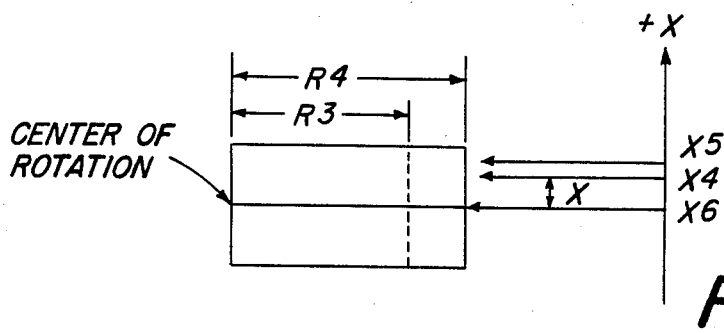

FIGS. 5, 6 and 7 will help to illustrate how the beam is aligned to the seam.

Figure 8:
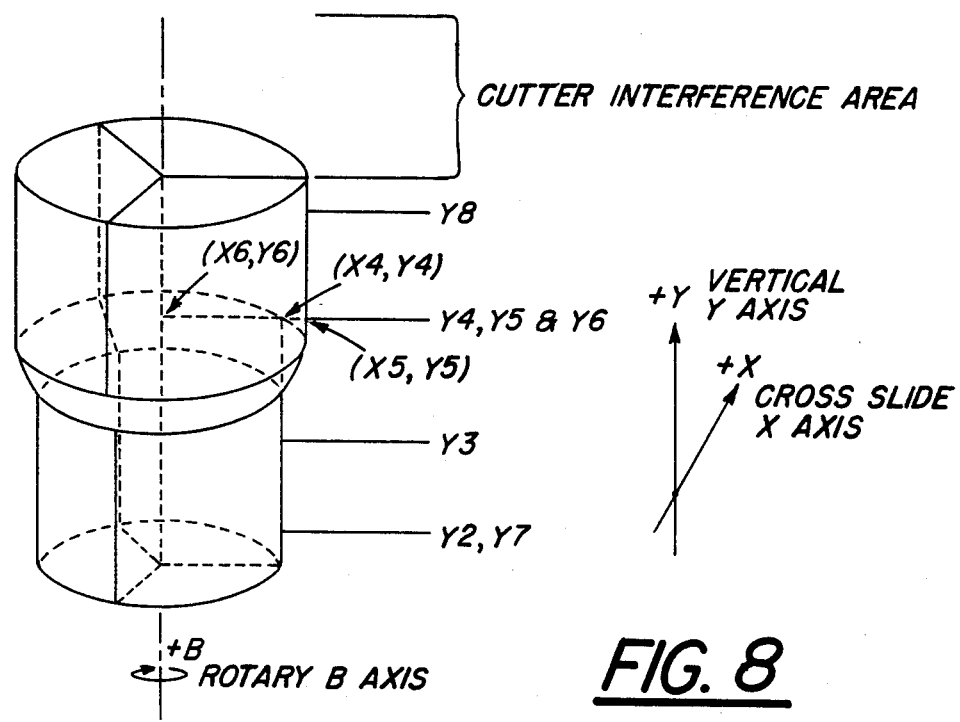
FIG. 8 is a perspective drawing which illustrates the relative position of the three segments which comprise a rock bit.

FIG. 8 shows in perspective how the three segments are held in the fixture prior to welding and illustrates in a general way the shape of the drill bit.

SUMMARY OF THE INVENTION

FIG. 5 illustrates in a general way a portion of the rock bit at one of the joints to be welded. The rock bit is formed with an upper section which has radius R4 and a lower section of radius R3.

Referring now to FIG. 5, let us suppose that bars (34) and (35) are sections of the segments to be welded. Let us also suppose that the axis about which the rotary table (9) rotates passes through the back edge of the plane represented by the adjacent surfaces of the two blocks to be welded. As pointed out above, the electron beam gun is mounted upon a compound slide arrangement which will move the gun in the vertical direction (Y) and/or the horizontal direction (X-axis). As a first step, it is necessary to align the plane of the joint with the direction of the beam. It is assumed that the parts are fastened to the fixtures so that the rear edge of the plane at the base is close to the center of rotation of the rotary axis of the table, and that the distances, R3 and R4 respectively, from the center of rotation to the outer surfaces of the parts at heights Y3 and Y4, respectively, are known.

Referring to FIG. 6, a top view, let us assume that the electron gun is so mounted that the electron beam is directed at right angles to the X-axis, and that the parts are so mounted on the fixture that the plane of the joint to be welded is at an angle of A1° from the perpendicular to the cross slide motion or X-axis. By directing the electron beam to the outer surface of the seam at Y4 and again at Y3, and determining the distance along the X-axis between these two points we can, through the use of simple geometry as follows, (NOTE: X4, X5 and X6 are readings of gun positions along the cross slide.)

$$\sin A1 = \frac{X}{R3} \quad \sin A2 = \frac{X5 - X4}{R4 - R3}$$

$$A1 = A2 \ \& \ \sin A1 = \sin A2$$

Therefore:

$$\frac{X}{R3} = \frac{X5 - X4}{R4 - R3}$$

$$X = \frac{R3*(X5 - X4)}{R4 - R3}$$

$$X6 = X4 - \left(\frac{R3*(X5 - X4)}{R4 - R3}\right)$$

determine the position the gun should take along the X-axis in order that the beam will strike the center of rotation of the table. The gun may then be moved to this position, X6, and the part rotated until the beam strikes the outer edge of the seam. This assures that the beam will pass along a line of the lower portion of the plane of the joint, since the back edge or the inner edge of the parts were placed at the lower end close to the center of rotation and the outer edge of the seam has been aligned with the beam which is now directed to the center of rotation of the worktable. This process may be repeated at the new position to refine the correction by the process of iteration if the joint happens not to pass through the center of rotation. Thus far, we have determined with certainty a position for the gun, X6, which will allow the beam to traverse the full depth of the joint to the center of rotation of the table. It is quite possible that the parts were so placed that the plane of the seam was not perpendicular to the surface of the turntable, but is at an angular position some degrees away from the perpendicular, so that if we move the gun in a direction perpendicular to the table it will not track the seam and will be off the seam by an amount depending upon the extent of the upward travel of the gun. In order to determine the deviation of the joint from the perpendicular, the following steps are taken:

A determination is made of the coordinates of a point at height Y4 but at radius R3. This is done by determining, through the use of the seam finder at height Y2, the coordinates X2/Y2 and then by extrapolation extending the straight line between X2/Y2 and X3/Y3 to X4/Y4. The deviation of the weld plane at height Y4 may then be determined.

In the alignment process, use is made of a seam finder device. This is an electronic system which oscillates the beam across the seam and automatically repositions the gun with respect to the seam so that the beam is centered directly over the seam.

The above description for purposes of explanation of the geometry has separated the determination of the angular displacement of the vertical plane of the abutting surface from a plane parallel to the plane the beam would describe in moving parallel to the axis of rotation of the table, and a determination of the angular tilt of the plane of the abutting surfaces from the vertical.

In a practical embodiment of the invention, the above two determinations have been combined in the following series of steps which lead to the determination of the path to be taken by the electron gun so that the beam generated by that gun passes through the full surface of the two segments in abutment and welds them completely. The determination of the path to be followed is made and retained in computer memory. This information is then directed to suitable servo amplifiers and servo mechanisms which control the motion of the electron gun along the two axes and this motion of the gun in conjunction with suitable control of the power delivered by the electron beam to the work completes the welding of the joint.

The steps in the overall process of alignment are as follows:

1. After loading the segments which make up the bits in the fixture, the fixture holding the tool bit is moved into the weld chamber and fastened to the rotary table.

2. The rotary table is then positioned so that one of the seams is placed in position for welding; that is, approximately aligned to the direction of the beam.

3. The cross slide axis (X-axis) is positioned so that the beam will pass through the known center of rotation of the table. The gun is positioned along the vertical axis so that the beam will strike a point close to the bottom of the segments at Y2.

4. The seam finder is energized and the gun is moved along the X-axis until the beam strikes the seam. The gun position is measured by means of an encoder and this position is stored in the memory of the computer as X2.

5. The gun is then raised to the height Y3 on the same radius of the segment.

6. The seam finder is energized and moves the gun along the X-axis until the beam strikes the seam.

7. The encoder transducer measures the position of the gun, X3, and this reading is stored in the memory of the computer for later use.

8. The coordinates of the points at X2/Y2 and X3/Y3 are processed in the computer to interpolate the coordinates X4/Y4 of a theoretical point at a height of Y4.

9. The gun is moved along the X and Y axes to the position X4/Y4.

10. With the gun at height Y4, the seam finder is energized and determines the position of the seam at the periphery.

11. The encoder transducer measures the coordinates at this point, X5, and stores it in memory.

12. By interpolation, determine the line of length R4 which passes through X4 from X5 to a point close to the rotary axis.

13. Store the X-axis position of this point at X6. This is the calculated rear edge of the plane of the joint.

14. Position the gun so that the beam will pass through X6.

15. Scan the seam with the seam finder at height Y5, and align the seam to the beam by rotating the table.

16. Store the rotary axis position as determined by the encoder in memory at APT B6. This is the position of the rotary axis where the beam is aligned with the joint.

17. Copy measurements X6, Y6 and B6 and place in new memory positions X10, Y10 and B10 for subsequent use.

18. Move the gun vertically along the Y-axis to height Y7, a position which corresponds to Y2.

19. Scan the seam area with the seam finder until the gun moves to a position where the beam strikes the seam.

20. Transfer the reading on the X-axis cross slide position encoder to APT X11.

21. Move the gun along the vertical axis upward to Y8, which is close to the top of the segments just underneath the cone area.

22. Scan the seam area with the seam finder, causing the gun to be moved along the X-axis until the beam is aligned with the seam at height Y8.

23. Transfer the measurement of the X-axis position encoder to APT X12.

24. By the interpolation process, test that APT points X10/Y10 are in a straight line between APT points X11/Y11 and X12/Y12.

25. Repeat above steps for welds #2 and #3.

Although the process described has referred to the welding of drill bits for use in deep drilling of oil wells, the process is not limited to that lone application, but is useful wherever workpieces of large dimension having abutting surfaces of large area requiring the deep penetration of the electron beam are to be welded. The invention is not to be limited to or by details of construction of the particular embodiment thereof illustrated by the drawings as various other forms of the device will of course be apparent to those skilled in the art without departing from the spirit of the invention or the scope of the claims.

What I claim is:

1. In a process for welding segments of a cylindrical workpiece along the abutting surfaces of adjoining segment surfaces utilizing a high energy particle beam which is arranged to move along two axes which are mutually perpendicular, the steps of:

fabricating the said segments so as to form at least two sections of differing radii on the assembled workpiece;

clamping the segments which form the said cylinder to a table arranged to rotate the said cylinder about its longitudinal axis;

positioning the said high energy particle beam so that it impinges upon a point at the outer edge of one of said abutting surfaces and recording the coordinates of said point of impingement with respect to said axes;

positioning the said beam so that it impinges upon a second point at the outer edge of the aforesaid abutting surface in the same section as the first point and recording the coordinates of said second point of impingement;

determining by extrapolation from the first two mentioned points a third point within the second section of the cylinder which is greater in radius than the first-mentioned section of cylinder and recording the coordinates of said third point;

positioning the beam so that it will pass through the third point which is inside the cylinder;

moving the beam so that it impinges upon a point at the outer edge of the abutting surfaces at the second of said cylindrical sections of different radii and recording the coordinates of said point of impingement;

determining by extrapolation along a line passing through the last-mentioned two sets of coordinates towards the center of said cylinder, the position of another point at a distance equal to the radius of the cylinder section from said point at the outer edge of said abutting surfaces and moving the beam so that it is in alignment with said point;

moving the rotary table so that the beam will pass through a point at the outer edge of the abutting surfaces so that the beam will be parallel to the abutting surfaces to be welded along a line passing through the last-mentioned points; and energizing the high energy particle beam at welding power and causing the beam to be moved so that the beam passes through all the points determined above.

2. In a process as in claim 1 in which the said high energy particle beam is an electron beam generated in an electron gun which is mounted so that it may be moved along two mutually perpendicular axes in relation to a workpiece.

3. In a process as in claim 1 in which the workpiece is a drill bit constructed from an assembly of two or more segments.

4. In a process as in claim 3 in which the segments for a particular size of drill bit are all of substantially the same dimension.

5. In a process for welding drill bits of stepped cylindrical shape by means of an electron beam generated by an electron gun which is arranged to move along two axes which are mutually perpendicular, the steps of:

clamping segments which form the said drill bit to a table arranged to rotate the said drill bit about its longitudinal axis;

positioning the said electron gun so that the electron beam generated by the said gun will impinge upon a point at the outer edge of one of the abutting surfaces between the aforementioned segments at a point close to the place of attachment to the rotary table and recording the coordinates of said gun position with respect to the said axes;

positioning the said gun so that it impinges upon a second point away from and at the outer edge of the aforesaid abutting surface in a section having the same radius as the first point of impingement and recording the coordinates of said second point of impingement;

determining by extrapolation from the first two mentioned points a third point within a second section of the drill bit which is greater in radius than the first-mentioned section and recording the coordinates of said third point;

positioning the electron gun so that its beam will pass through the third point, which is inside the body of the drill bit;

moving the gun so that its beam impinges upon a fourth point at the outer edge of the abutting surfaces along a radial line passing through the third point and recording the coordinates of said fourth point;

determining by extrapolation along the line passing through the last-mentioned two sets of coordinates another point at a distance equal to the radius at the fourth point and positioning the gun so that the beam is in alignment with said last-mentioned point;

moving the rotary table about its axis of rotation so that the beam will pass through a point at the outer edge of the abutting surfaces so that the beam will be parallel to the abutting surfaces to be welded along a line passing through the last-mentioned points; and energizing the electron gun and causing the gun to be moved so that the beam passes through all the points determined above.

6. In a process for welding drill bits by means of an electron beam generated by an electron gun which is arranged to move along two axes, X and Y, which are mutually perpendicular, the steps of:

clamping segments which form the said drill bit to a table arranged to rotate about an axis parallel to the said Y axis;

positioning the said electron gun so that the electron beam generated by the said gun will impinge upon a point at the outer edge of one of the abutting surfaces between the aforementioned segments at a point close to the place of attachment to the rotary table and recording the coordinates of said gun position with respect to the said axes;

positioning the said gun so that its beam impinges upon a second point away from and at the outer edge of the aforesaid abutting surface in a section having the same radius as the first point of impingement and recording the coordinates of said gun position;

determining by extrapolation from the first two mentioned sets of coordinates a third set of coordinates which define the position the gun should take so that its beam passes through a third point within a second section of the drill bit, the said third point being in line with the first two points, and recording the X and Y coordinates of said third gun position;

positioning the electron gun to said third set of coordinates so that its beam will pass through the said third point, which is inside the body of the drill bit;

moving the gun along a path parallel to the said X axis to a position so that its beam impinges upon a fourth point at the outer edge of the abutting surfaces at the said second section of greater radius and recording the coordinates of the gun at said fourth point of impingement;

determining by extrapolation along the line passing through the last-mentioned two sets of coordinates another point close to or at the center of the drill bit and at a distance equal to the radius of the drill bit from the fourth point;

positioning the gun so that the beam is in alignment with said last-mentioned point;

moving the rotary table so that the beam will pass through a point at the outer edge of the abutting surfaces so that the beam will be parallel to the abutting surfaces to be welded along a line passing through the last-mentioned points; and energizing the electron gun and causing the gun to be moved so that the beam passes through all the points determined above.

* * * * *